(12) United States Patent
Trapp

(10) Patent No.: US 9,696,092 B2
(45) Date of Patent: Jul. 4, 2017

(54) FURNACE COOLING PANEL MONITORING SYSTEM

(71) Applicant: Mark Edward Trapp, Clinton, PA (US)

(72) Inventor: Mark Edward Trapp, Clinton, PA (US)

(73) Assignee: CIX Inc., Clinton, PA (US)

( * ) Notice: Subject to any disclaimer, the term of this patent is extended or adjusted under 35 U.S.C. 154(b) by 0 days.

(21) Appl. No.: 15/025,286

(22) PCT Filed: Jul. 13, 2015

(86) PCT No.: PCT/US2015/040198
§ 371 (c)(1),
(2) Date: Mar. 28, 2016

(87) PCT Pub. No.: WO2016/010919
PCT Pub. Date: Jan. 21, 2016

(65) Prior Publication Data
US 2017/0016675 A1    Jan. 19, 2017

(51) Int. Cl.
*F27D 1/12*     (2006.01)
*F27D 1/00*     (2006.01)
(Continued)

(52) U.S. Cl.
CPC ........ *F27D 21/0014* (2013.01); *C21C 5/4673* (2013.01); *F27B 3/24* (2013.01);
(Continued)

(58) Field of Classification Search
CPC .... F27B 3/24; F27B 3/28; F27B 14/20; F27B 2014/0837; F27D 21/0014; F27D 21/04;
(Continued)

(56) References Cited

U.S. PATENT DOCUMENTS 4,067,237 A    1/1978  Arcella
6,249,538 B1*  6/2001  Pavlicevic ................ F27B 3/24
                                                    373/71

(Continued)

FOREIGN PATENT DOCUMENTS

JP    07011453 B2   2/1995
KR      0017930 A   3/2004

*Primary Examiner* — Hung D Nguyen
(74) *Attorney, Agent, or Firm* — Invention To Patent Services; Alex Hobson

(57) ABSTRACT

A furnace cooling panel monitoring system utilizes individual cooling panel data to produce critical monitoring data. An exemplary cooling panel monitoring system utilizes the input from a plurality of temperature sensors configured to accurately measure the temperature change of cooling fluid flowing through each individual panel. The change in temperature from the inlet to the outlet of a cooling panel along with the flow rate of the cooling fluid through the panel can be used to calculate the a heat energy dissipation rate of the cooling panel, or heat flux. The flow rate through individual panels is determined by K-values or resistance to flow constants for a given cooling panel. The heat energy dissipation rate for individual panels can be provided to a user through a computer implemented monitoring program in real time. Alerts may be initiated by the computer implemented monitoring program when a threshold value has been exceeded.

20 Claims, 9 Drawing Sheets

(51) Int. Cl.
*F27D 21/00* (2006.01)
*F27B 3/28* (2006.01)
*F27B 3/24* (2006.01)
*F27D 21/04* (2006.01)
*C21C 5/46* (2006.01)
*F27B 14/20* (2006.01)
*F27D 11/08* (2006.01)
*F27D 19/00* (2006.01)
*C21C 5/52* (2006.01)
*F27B 14/08* (2006.01)
*F27D 9/00* (2006.01)

(52) U.S. Cl.
CPC ............... *F27B 3/28* (2013.01); *F27B 14/20* (2013.01); *F27D 11/08* (2013.01); *F27D 21/04* (2013.01); *C21C 2005/5288* (2013.01); *F27B 2014/0837* (2013.01); *F27D 2009/0013* (2013.01); *F27D 2019/0025* (2013.01); *Y02P 10/216* (2015.11)

(58) Field of Classification Search
CPC .... F27D 2019/0025; F27D 1/12; F27D 11/08; F27D 2009/0013; C21C 5/4673; C21C 2005/5288; Y02P 10/216
USPC ......... 373/60, 71, 72, 75, 76, 113, 138, 154, 373/155, 156, 158, 163, 164, 165, 114; 266/241, 194; 165/170, 256, 260; 432/116, 233
See application file for complete search history.

(56) References Cited

U.S. PATENT DOCUMENTS

| | | | |
|---|---|---|---|
| 7,832,367 B2 | 11/2010 | Valentas et al. | |
| 2008/0203630 A1* | 8/2008 | Weber | C21B 7/10 266/275 |
| 2013/0206358 A1 | 8/2013 | Maddalena et al. | |
| 2015/0285559 A1* | 10/2015 | Nagai | F23M 11/04 432/32 |

* cited by examiner

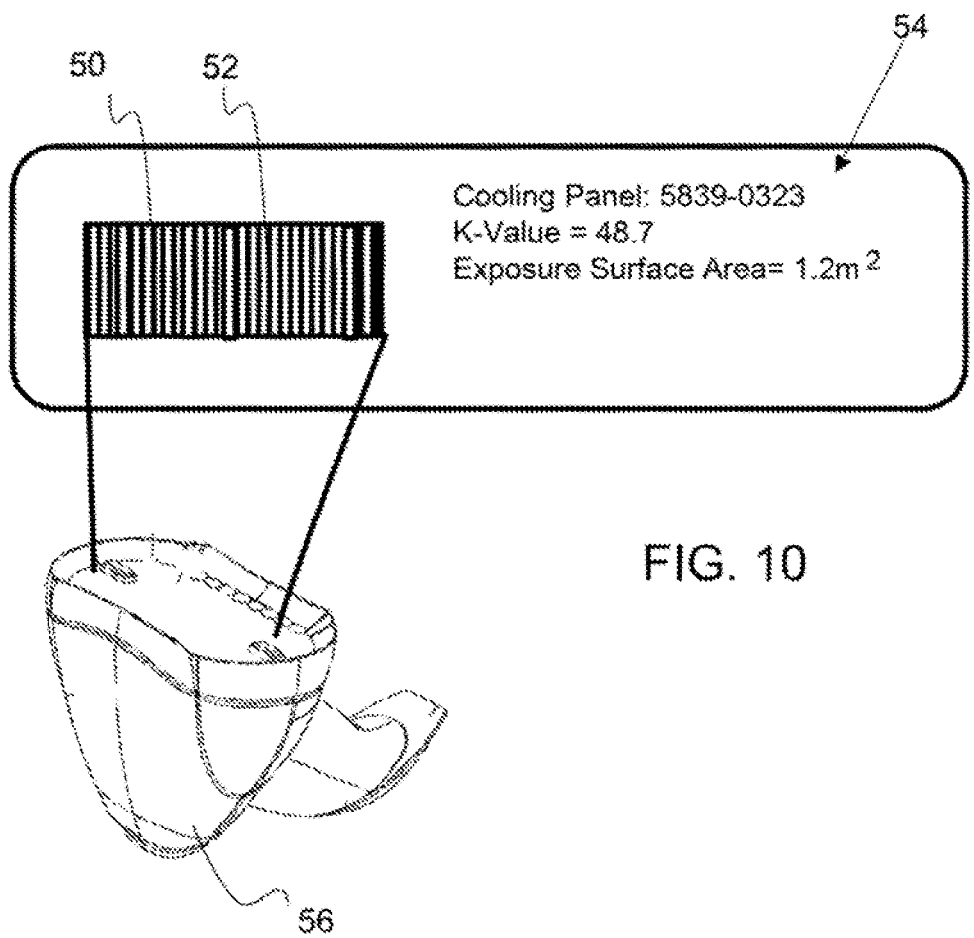

FURNACE COOLING PANEL MONITORING SYSTEM

CROSS REFERENCE TO RELATED APPLICATIONS

The application claims the benefit and priority to U.S. provisional patent application No. 62/025,036, filed on Jul. 16, 2014, entitled Furnace Cooling Panel Monitoring System; the entirety of which is incorporated by reference herein.

BACKGROUND OF THE INVENTION

Field of the Invention

The present invention relates to furnace cooling panel monitoring systems and particularly those for electric arc furnaces and basic oxygen furnaces.

Background

High temperature reactors, such as electric arc furnaces, that operate at very high temperatures require cooling of the furnace walls to protect the furnace wall and other components of the furnace from the molten metal, slag and hot process gas. Cooling panels are configured around the furnace and cooling liquid, water in most cases, is pumped through cooling panel conduits to dissipate the heat. Monitoring the temperature of a furnace can be difficult because of the excessive heat, corrosive gases, magnetic fields generated by the process and the high cooling liquid flow rate. Placement of temperature sensors proximate the cooling wall is particularly difficult as the high temperatures and other extreme conditions listed make sensors particularly unreliable. It is critically important to ensure that the cooling system functions properly and that hot spots around the furnace are minimized. When the furnace walls are exposed to excessively high temperatures for too long, it compromises the furnace components, such as the furnace walls, and requires earlier change out of these components. Shut down of the furnace and the early replacement or servicing of components cost considerable amounts of money. In addition, if a cooling panel fails and water leaks into the furnace, the water can disassociate and reform to cause a furnace explosion. Traditional temperature monitoring systems have proven to be unreliable given the extreme conditions of these types of reactors.

SUMMARY OF THE INVENTION

The invention is directed to a furnace cooling panel monitoring system that utilizes individual cooling panel data to produce critical monitoring data. In an exemplary embodiment, a cooling panel array comprises two or more individual cooling panels configured between an array cooling fluid inlet and array cooling fluid outlet. An exemplary cooling panel monitoring system comprises a plurality of temperature sensors configured to measure the temperature change of cooling fluid flowing through each individual cooling panel. The change in temperature from the inlet to the outlet of a cooling panel along with the flow rate of the cooling fluid through the panel can be used to calculate the a heat energy dissipation rate of the cooling panel, or heat flux. The specific heat of water is 1.0 calorie/gram ° C. It takes one calorie of energy to raise one gram of water one degree Celsius. Therefore, in order to determine the heat energy dissipation rate for an individual cooling panel, the liquid or fluid flow rate through the panel must be known. The amount of cooling fluid that will flow through each individual cooling panel will depend on the resistance to flow of that panel and the configuration of that cooling panel with respect to the other cooling panels within the array. Determining the flow rate through a particular cooling panel can be accomplished by placement of individual flow meters within each panel or proximate the inlet and/or outlet of each cooling panel. This however, is expensive and the flow rate sensors may have maintenance and/or performance issues due to the extreme environments. In an exemplary embodiment, the cooling panel monitoring system described herein determines the cooling fluid flow rate through an individual panel by utilizing a K-value for each panel. A K-value is a resistance value for flow through a panel, wherein the K-value is equal to the liquid of fluid flow rate (Q) through a cooling panel divided by the square root of the pressure drop across the panel (dp), from the inlet to the outlet of the panel, wherein:

$$K\text{-value}=Q/(dp)^{1/2}$$

The K-value of a cooling panel may be determined by measuring the pressure drop across the panel as a function of flow rate, as shown in FIG. 4. The K-value is preferably provided by the manufacturer of the cooling panel and the K-value may be provided with the panel in any suitable manner. In an exemplary embodiment, the K-value is provided in an instruction symbol, such as a bar code that is on the cooling panel packaging or container or directly on the cooling panel. An instruction symbol scanner may be used to read the instruction symbol and input the K-value and any other pertinent data about the cooling panel into the cooling panel monitoring system. Other data related to an individual cooling panel may include exposure surface area, length of conduit, diameter of conduit, number of bends, max temperature rating, maintenance schedules, threshold values and the like.

Cooling panels configured around a furnace come in all different sizes and shapes to accommodate various furnace designs and to fit around or in-between furnace components, such as an electric arc generator. The conduit or conduits within a cooling panel may have greatly different lengths, diameters and number of bends. All of these factors contribute to a unique K-value for a given cooling panel. The cooling panels may be configured in parallel and/or in series between a cooling fluid inlet and outlet to the system. Much like an electrical circuit, the amount of current, or flow rate of cooling fluid, can be determined using the equations for resistive elements in series and/or in parallel within a circuit. The total pressure drop across the cooling system is analogous to the voltage of an electrical circuit and the flow rate is analogous to the current. The K-values of each individual cooling panel are analogous to individual resistors in the electrical circuit. The cooling panel monitoring system, as described herein, may comprise a cooling panel array feature that allows a user to model a cooling panel array along with the associated K-values of each panel, as generally shown in FIG. 3. A user may design a cooling panel array by dragging and dropping the individual cooling panel details, as inputs into the computer implemented monitoring program, into a specific cooling panel configuration that represents the actual location of the cooling panels within the system. A cooling panel array design feature may also provide input fields for other components of the cooling panel array including, but not limited to connector conduit details, values, transitions and the like. The details of the other components, such as a connector conduit, may comprise geometric inputs, such as length and/or diameter or number of bends, or they may accept a K-value input. A valve component may have a K-value that is input into the computer implemented monitoring program. The additional component details may be used in conjunction with the K-values of the cooling panels by the computer implemented monitoring program to calculate the amount of flow through the individual cooling panels.

In an exemplary embodiment, a temperature sensor is configured to measure the inlet cooling fluid temperature to the cooling panels and a separate temperature sensor is configured to measure the outlet cooling fluid temperature from the panels. Temperature sensors configured at the inlets and outlets of the panels may be more reliable than temperature sensors configured within or proximate the wall of the furnace. The temperature sensors are configured to provide real-time data to the cooling panel monitoring system through any suitable means. The temperature sensors may provide an output signal through a physical wire that is coupled with a computer implemented monitoring program, or the sensors may transmit a wireless signal. Likewise, any flow rate data may be provided to the computer implemented monitoring program through any suitable means.

The furnace cooling panel monitoring system, as described herein, is configured to provide real time data of heat energy dissipation rates of individual cooling panels. After an operator has designed the cooling panel array and input the K-values of the individual panels, the computer implemented monitoring program will calculate the amount of cooling fluid flow through each individual panel as a function of the inlet flow rate to the system. The temperature change from the inlet to the outlet of each cooling panel is then received to calculate the heat energy dissipation rate for each panel. This rate may be displayed in a chart or graphically on a display screen. In an exemplary embodiment, the heat energy dissipation rate is normalized for exposure surface area of an individual panel, thereby providing a specific heat energy dissipation rate. The exposure surface area is the relative amount of furnace wall that an individual panel is exposed to or responsible for dissipating heat therefrom. The exposure surface area may also be provided with a cooling panel from the manufacturer. A specific heat energy dissipation rate is the heat energy dissipation rate divided by the exposure surface area. A user may choose to display the heat energy dissipation rates or the specific heat energy dissipation rates. In an exemplary embodiment, a heat map display diagram is provided that shows a representation of the cooling panels configured around the furnace wherein each panel is a specific color or hue that represents a heat energy dissipation rate. A heat map display diagram may quickly alert an operator if a panel is much hotter than the other panels, or if there is a region of the furnace that is much hotter. An operator may change furnace parameters to moderate any temperature spikes within the furnace and thereby prevent explosions and damaging conditions to the furnace. Keeping the furnace walls within certain temperature limits can greatly extend the life of furnace components and provide a more cost efficient system.

The furnace cooling panel monitoring system may provide selection inputs for a user to view any number of different types of displays. A user may choose to view a line graph display having one or more individual cooling panels and the cumulative output. The display charts produced by the furnace cooling panel monitoring system may be stored by the furnace cooling panel monitoring system for later review or for documentation purposes. A user may choose to view a diagram or schematic display of the cooling panels with respect to each other. A diagram display may have real time data provided for each cooling panel displayed and/or may be a heat map display. A user may add or delete individual cooling panels to a display as desired. A user may choose to view a chart or spreadsheet of the data and again this data may be stored for future review and/or documentation purposes.

An operator may interface with the computer implemented monitoring program to display heat energy dissipation rates in any suitable format. A user may display the heat energy dissipation rate for one, or a plurality of cooling panels. A user may input threshold values for individual cooling panels or for the overall cooling panel array. The computer implemented monitoring program may be configured to alarm when any threshold value is exceeded. A visual and/or audio output may be used to signal an alarm condition. For example, if the operator is viewing a heat map display diagram, a cooling panel that has exceeded a threshold heat energy dissipation rate may blink and/or change color to signal an alarm condition. In addition, the computer implemented monitoring program may initiate an audible alarm through any suitable audio output device, such as speakers, alarm sirens, headphones and the like. An alarm siren may be configured near a furnace to alert personnel in the area to take corrective actions, shut down the furnace and/or leave the area.

The display graphs, charts and heat maps may be configured to display the heat energy dissipation rates or the rate of change of heat energy dissipation rates. If a panel is exposed to too much heat, it will have a very quick increase in heat energy dissipation rate and this high rate of change or heat dissipation flux rate may indicate a problem that needs to be addressed quickly. A threshold heat dissipation flux rate may be input into the computer implemented monitoring program by a user or may be provided by the manufacturer. A very high heat energy dissipation flux rate may subject a cooling panel to high stress as the materials of construction may be heating up too quickly. The sampling rate of the input variables, including cooling fluid temperature inputs, and cooling fluid flow rates, into the furnace cooling panel monitoring system may be any suitable rate including, but not limited to, more than about 60 Hz, more than about 30 Hz, more than about 1 Hz, no less than every 2 seconds, no less than every 10 seconds, and any range between and including the sampling rates provided. A high sampling rate may provide better resolution of display and more reliably and accurately alert a user of an alarm condition. Every second may be critical when an alarm condition is identified.

A differential threshold value may also be input by a user or set automatically by the cooling panel monitoring system. A differential threshold value is the threshold differential heat energy dissipation rate between a first cooling panel and a cooling panel proximate said first cooling panel. If two cooling panels configured adjacent to one another have greatly different heat energy dissipation rates, this may be cause for alarm. The computer implemented monitoring program may initiate an alarm if this differential exceeds a differential threshold value. A differential threshold value may be set for a heat energy dissipation rate, a specific heat energy dissipation rate or a heat dissipation flux rate.

A threshold value may be a specific heat energy dissipation rate that a user inputs or is provided by the manufacturer of the cooling panel. A threshold value may also be configured by a system user or be an automatic set point of the computer implemented monitoring program.

The cooling panel monitoring system, as describe herein, may be used for any suitable high temperature reactor including, but not limited to, electric arc furnaces, basic oxygen furnaces (BOF), pyrometallurgical furnaces, autoclaves, hot gas vessels such as flash furnaces, combustion chambers, or gas-solid reactors, induction furnaces, blast furnaces, slag furnaces, and aluminum electrolytic cells. High temperature reactors may operate at very high temperatures such as at thousands of degrees Celsius above standard temperature.

Any suitable cooling fluid may be used with cooling panels that are monitored by the furnace cooling panel monitoring system. The specific heat value for the cooling fluid may be input into the computer implemented monitoring program to ensure proper heat energy dissipation rate calculations.

In an exemplary embodiment, a method of using the furnace cooling panel monitoring system, as described in any of the embodiments herein, is provided. The method comprises the steps of designing a cooling panel array with the computer implemented monitoring program. As described, the step of designing the cooling panel array may comprise dragging and dropping cooling panel icons and connectors between a cooling fluid inlet and outlet to model an actual cooling panel array. The method comprises the step of inputting the K-values of a plurality of panels. As described, this step may comprise reading the K-values from an instruction symbol, such as a bar code. The K-values may be configured with a cooling panel icon that is configured in a cooling panel array model, as generally shown in FIG. 3. The method comprises the step of inputting cooling panel fluid inlet and outlet temperatures. As described, the temperature sensors may be physically coupled with the computer implemented monitoring program or they may send a wireless signal that is received and input into the computer implemented monitoring program. The method comprises the step of inputting the inlet flow rate to the cooling panel array. Again this may be accomplished by a senor being physically coupled or by a wireless signal. The method comprises the step of the computer implemented monitoring program calculating the cooling fluid flow rate through each individual cooling panel, utilizing the K-values and the cooling panel array model. The method comprises the step of the computer implemented monitoring program calculating the heat energy dissipation rate of individual panels utilizing the calculated cooling fluid flow rate and the temperature differential between the inlet and the outlet of the individual panel. The method comprises the step of displaying the heat energy dissipation rates for a plurality of panels. The method may optionally comprise the step of inputting the exposure surface area and the computer implemented monitoring program calculating a specific heat energy dissipation rate for an individual panel. As described herein, the computer implemented monitoring program may display heat energy dissipation rates in any suitable format including, but not limited to, charts, graphs, heat map diagrams and the like. The method may also include the step of the computer implemented monitoring program initiating an alarm if a threshold value, as described herein, is exceeded.

In another embodiment, a furnace cooling panel monitoring system comprises input from a plurality of cooling panels configured around exhaust conduits from a furnace. The conduits from a furnace may also require careful monitoring of the heat energy dissipation rates. As described for cooling panels configured around a furnace, the inlet and outlet cooling fluid temperature to cooling panels configured around an exhaust conduit, as well as the cooling fluid flow rates, as determined by the K-value, may be input into the furnace cooling panel monitoring system for the calculation of the heat energy dissipation rate.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
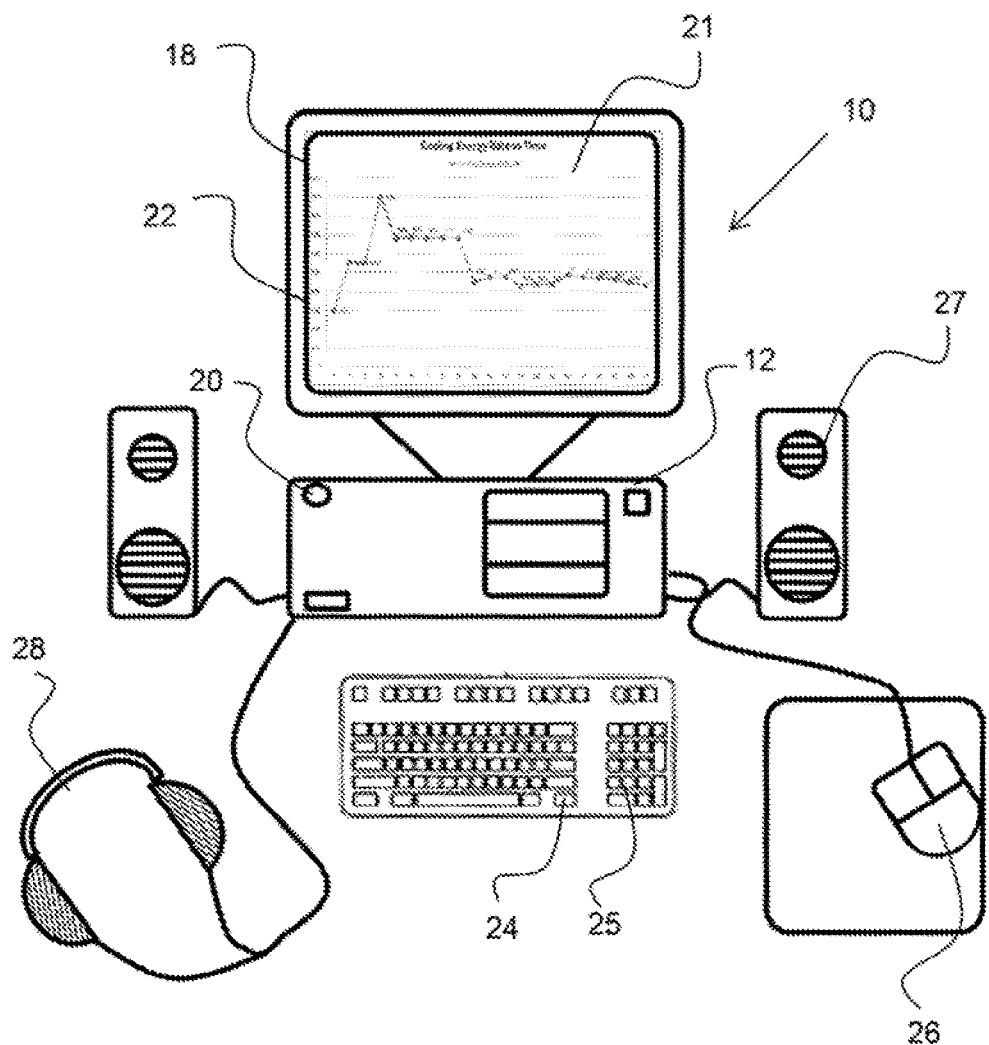

FIG. 1 shows an exemplary monitoring station for a furnace cooling panel monitoring system, as described herein.

Figure 2:
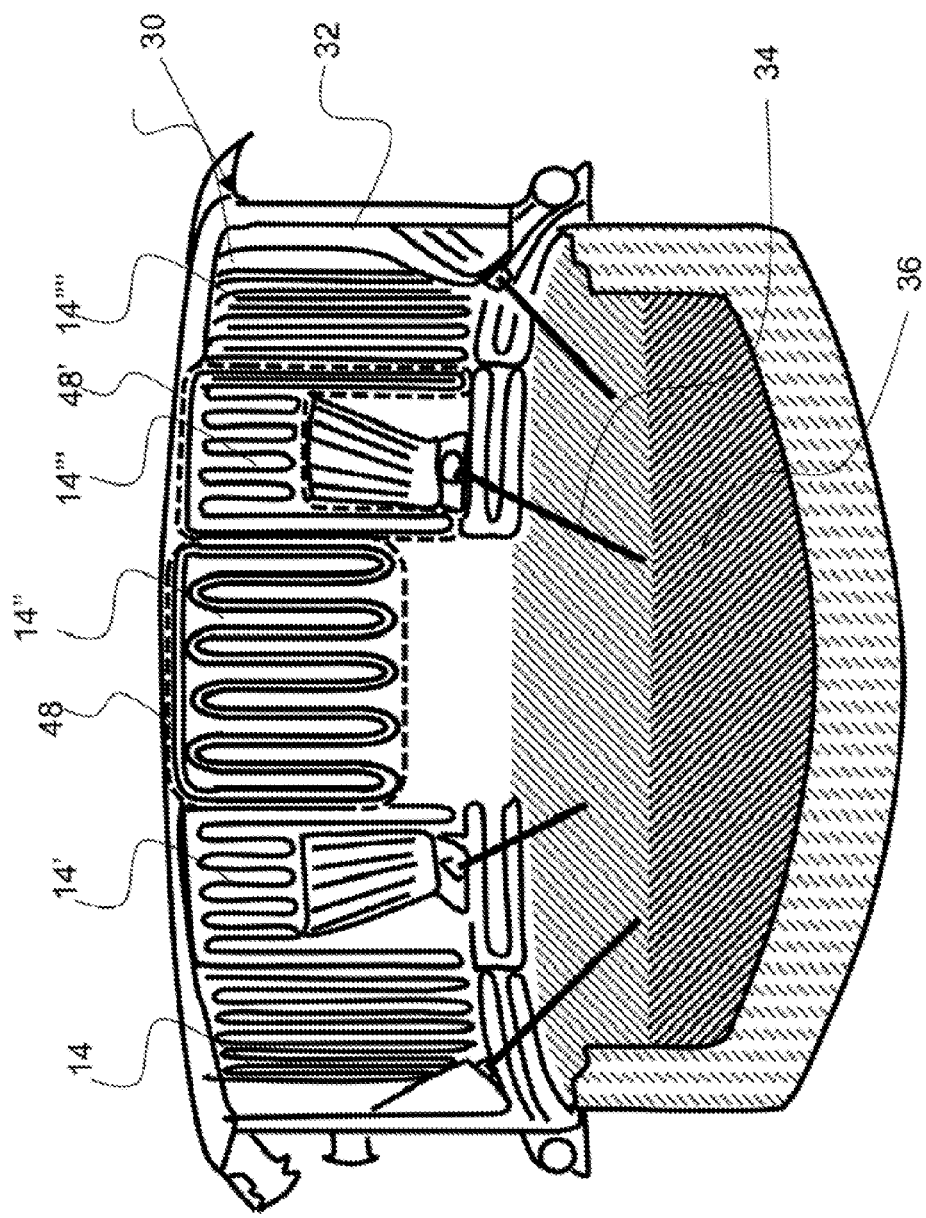

FIG. 2 shows an exemplary electric arc furnace having a plurality of cooling panels.

Figure 3:
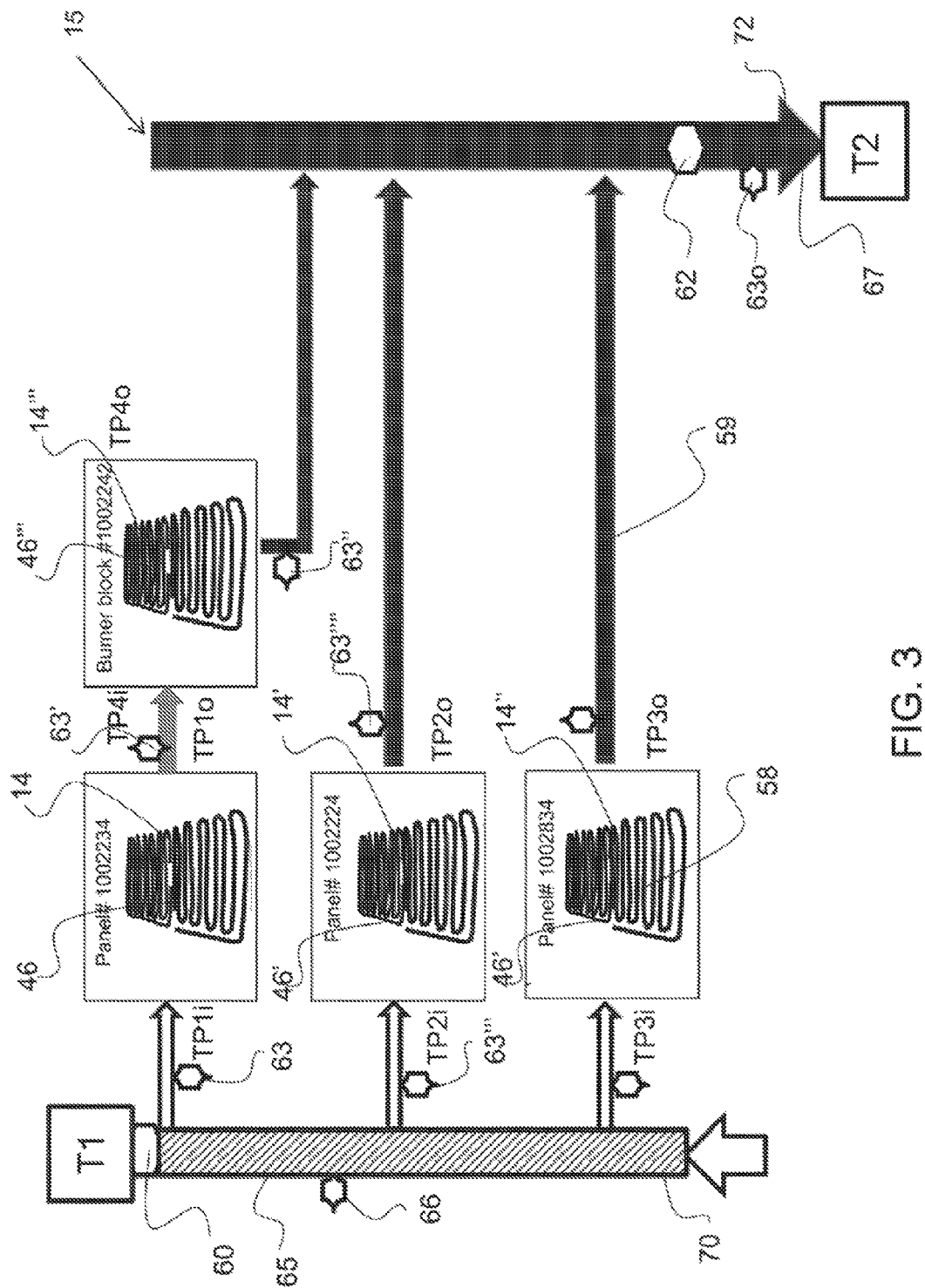

FIG. 3 shows a diagram of a cooling panel array comprising a plurality of individual cooling panels configured between an array cooling fluid inlet and an array cooling fluid outlet.

Figure 4:
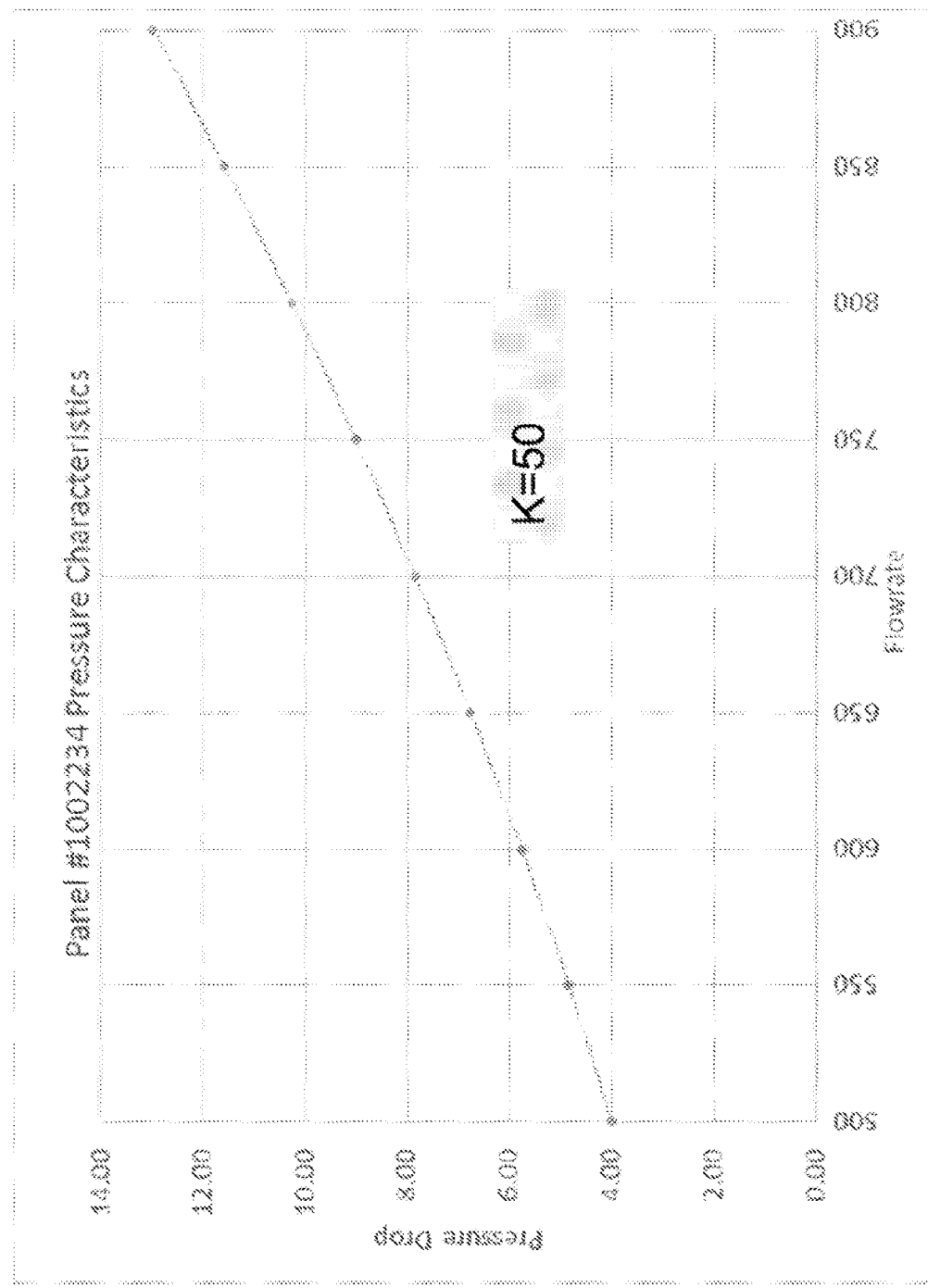

FIG. 4 shows a graph of pressure drop versus flow rate for an exemplary panel and an associated K value.

Figure 5:
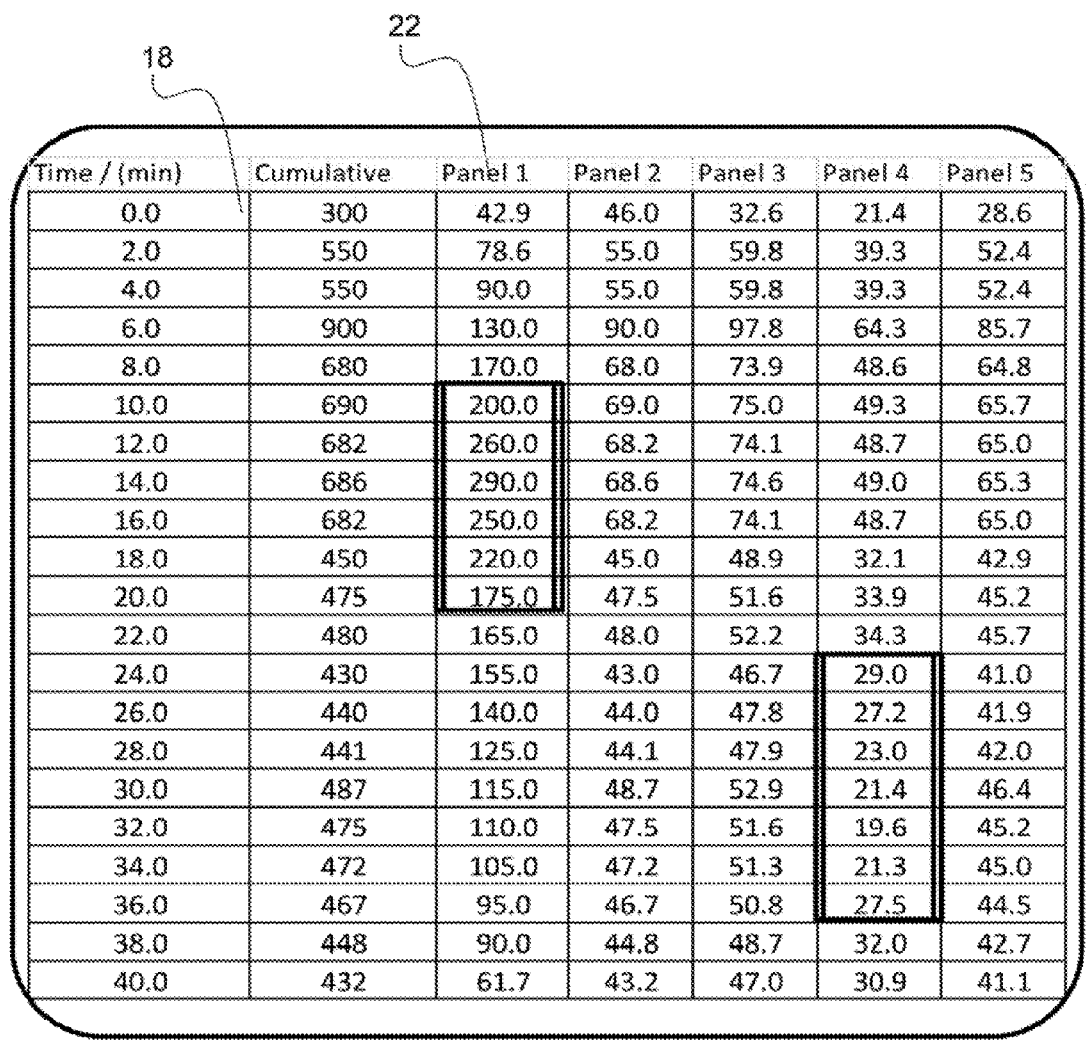

FIG. 5 shows an exemplary display chart of panel heat energy dissipation rates as a function of time.

Figure 6:
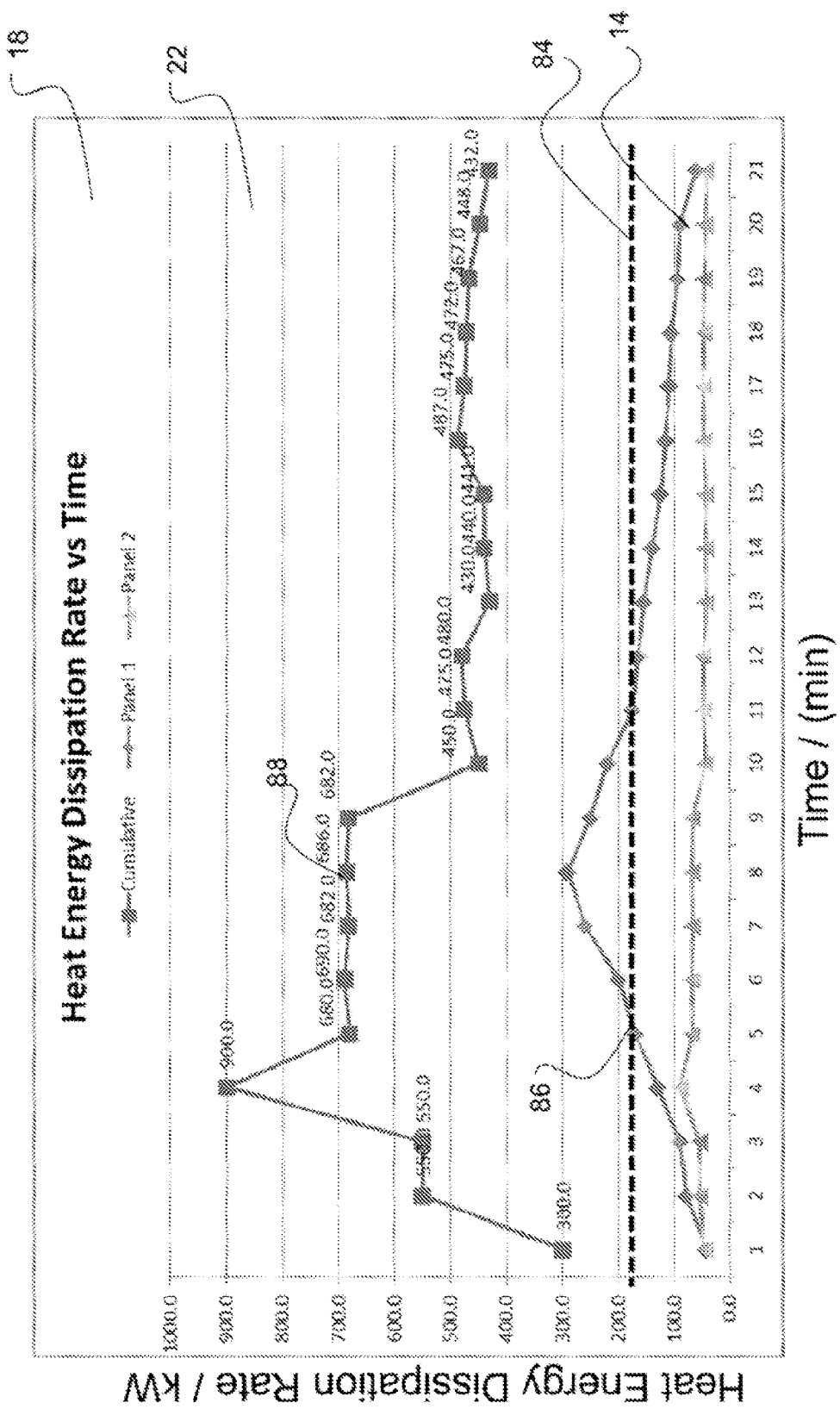

FIG. 6 shows an exemplary display graph of heat energy dissipation rates as a function of time with a threshold value that is being surpassed by one of the cooling panels.

Figure 7:
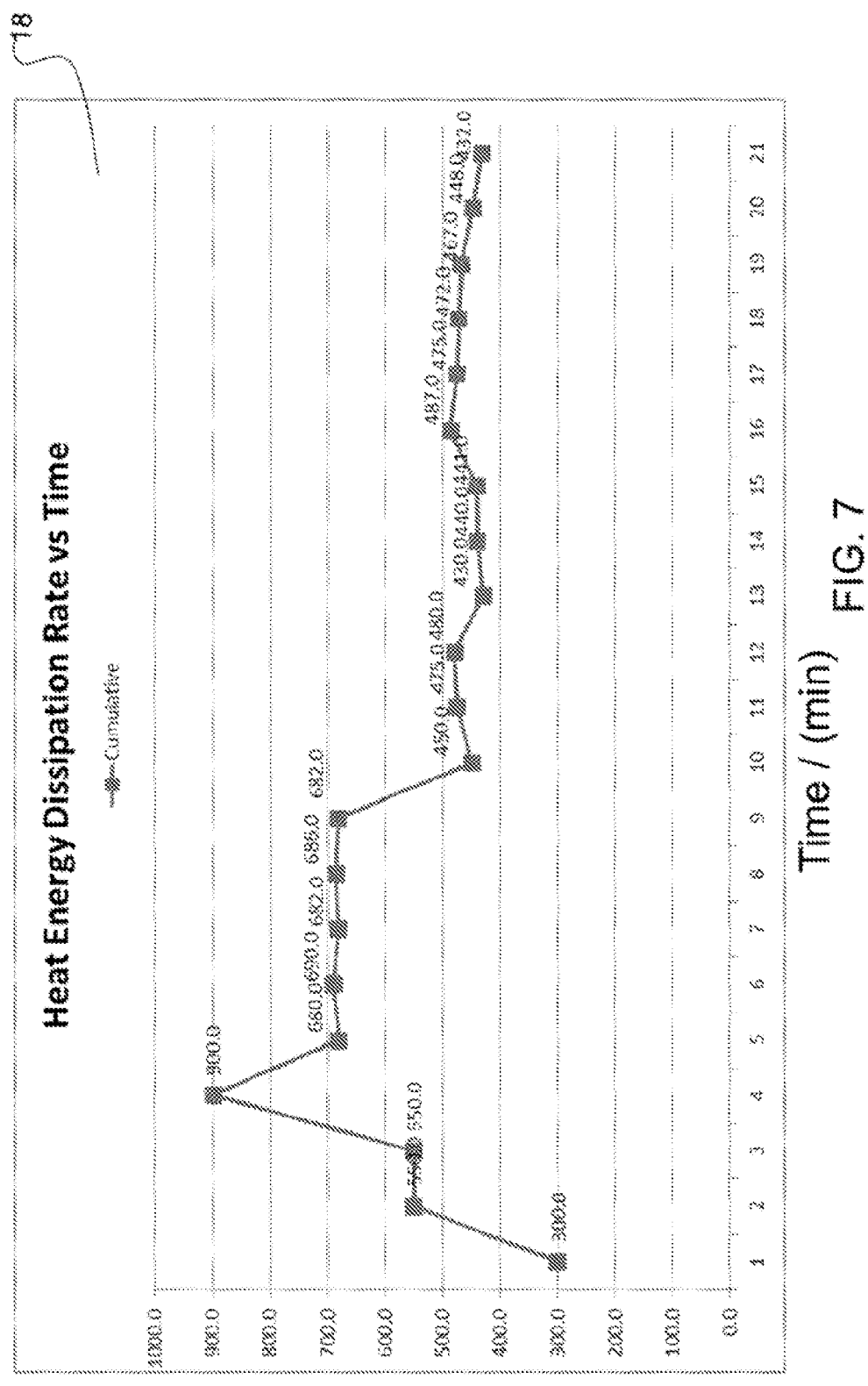

FIG. 7 shows an exemplary display graph of heat energy dissipation rate as a function of time.

Figure 8:
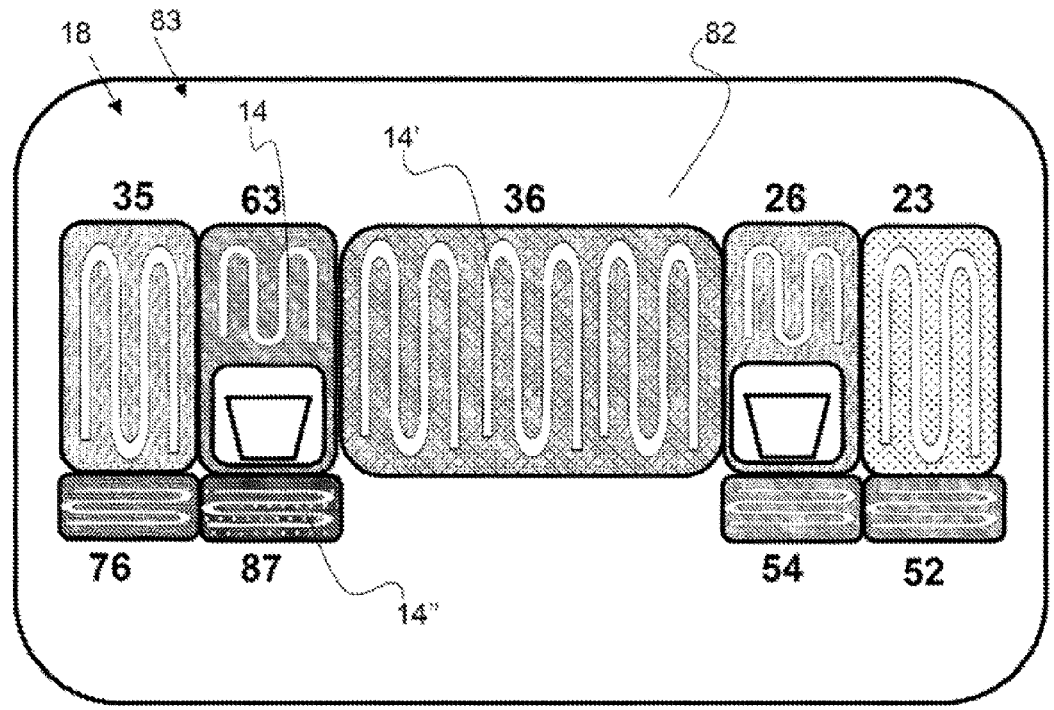

FIG. 8 shows an exemplary heat map display diagram of cooling panels configured around a furnace.

Figure 9:
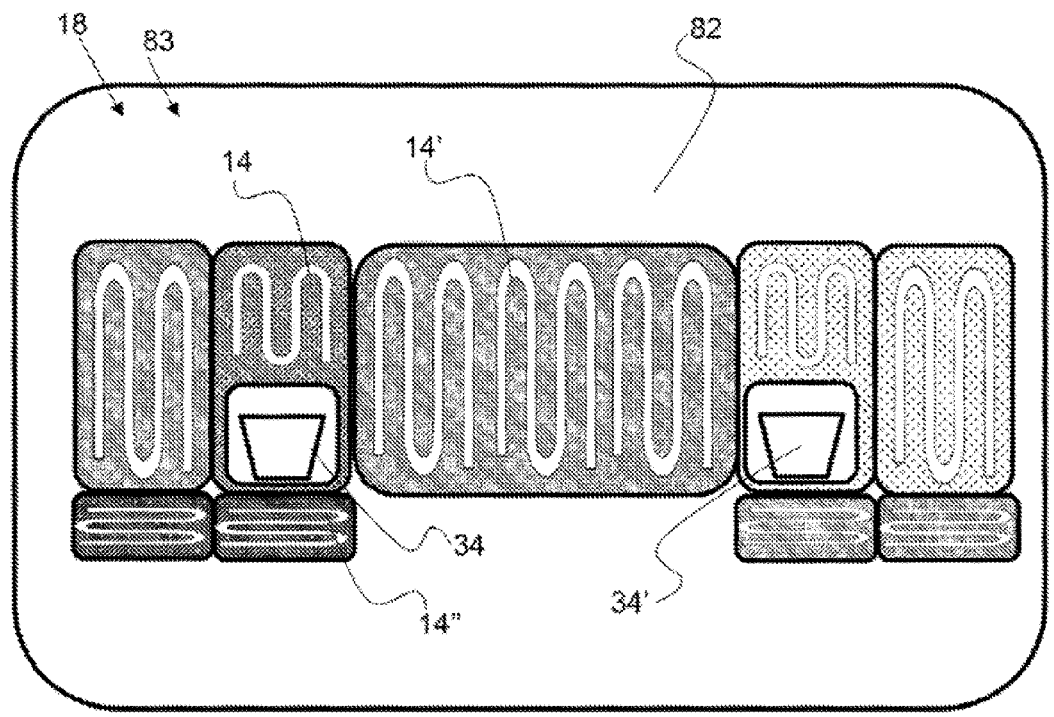

FIG. 9 shows an exemplary heat map display diagram of cooling panels configured around a furnace.

FIG. 10 shows an exemplary cooling panel container that has a bar code type instruction symbol containing at least the K-value for the cooling panel.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1 an exemplary monitoring station for a furnace cooling panel monitoring system 10, as described herein, comprises a display screen 22 having a display 18 being presented to a user or the system. In addition, the exemplary furnace cooling panel monitoring system comprises a computer 20 having a computer implemented computer program 12 that receives inputs from a plurality of sensors and generates output for display on the display screen. As shown, a graph of heat energy dissipation rate as a function of time is being displayed. The furnace cooling panel monitoring system also comprises an audio output 27, such as speakers or headphones 28, that may be used to alert a user if a threshold condition has been exceeded. A keyboard 25, mouse 26 and touchscreen 21, examples of user interface features 24, enable a user to interact with the computer implemented monitoring program. A user may change display views, input and/or change threshold values, input and/or change K-values for individual cooling panels, change the cooling flow rate to the system and/or abort a furnace run.

As shown in FIG. 2, an exemplary electric arc furnace 32 comprises a plurality of cooling panels 14-14''''. The cooling panels are of different sizes, have different bends and cooling conduit configurations and are located in different locations relative to the molten metal 36 and/or the electric arc 34. The K-value for the panels will be different and the heat energy dissipation rate for each panel may be determined by monitoring the incoming cooling fluid temperature, the outgoing cooling fluid temperature and the cooling fluid flow rate. An equation may be used to calculate the heat dissipation rate for each panel utilizing the specific K-value for each panel. In addition, each panel has an associated exposure surface area, or surface area of the furnace that is cooled by a panel. The exposure surface area is represented by the dashed lines around cooling panels 14'' and 14'''. The exposure surface area 48 of panel 14'' is considerably larger than the exposure surface area 48' of panel 14'''. The heat energy dissipation rates may be normalized by this exposure surface area value and the exposure surface area value may be provided along with the K-value for each panel in an instruction symbol. Normalizing the heat dissipation rate by exposure surface area enables an operator to convert the heat energy dissipation rates of the individual panels into an array of sensors. The cooling panels become sensors that enable an operator to monitor a furnace for hot spots.

FIG. 3 shows a diagram of a cooling panel array 15 comprising a plurality of individual cooling panels 14-14''' configured between an array cooling fluid inlet 70 and an array cooling fluid outlet 72. An array cooling fluid inlet temperature sensor 66 and array cooling fluid outlet temperature sensor 68 for the entire cooling panel array may be used along with array cooling fluid inlet flow rate to determine an overall system heat energy dissipation rate. The cooling fluid flow rate into the array is measured by an inlet flow rate sensor 60 and the array cooling fluid outlet flow rate is measure by an outlet flow rate sensor 62. The contribution of heat dissipation from each cooling panels within the array 14-14''' can be determined using the K-values of each panel in the array 46-46'''. The K-value of a given cooling panel, along with the configuration of the cooling panel in the array with respect to the other cooling panels, will determine how much cooling fluid flows through each panel. In an exemplary embodiment, the computer implemented monitoring program calculates the amount of cooling fluid flow through each cooling panel within the array and uses the inlet and outlet cooling fluid temperature data to calculate a heat dissipation rate. Much like an electrical circuit, the amount of flow through a given panel can be determined by the specific resistance to flow, or K-value. In some situations the cooling panels are configured in series between the cooling fluid inlet and outlet, such as cooling panels 14 and 14'''. In other situations, the cooling panels are configured in parallel between the cooling fluid inlet and outlet, such as cooling panels 14' and 14''. In this example, the relative amount of flow through the top two cooling panels, $Q_{14}$ will be a portion of the overall flow Q, or the flow from T1 to T2, through the system as defined by:

$$Q_{14}=(1/(K14+K14'''))/((1/K14+K14''')+(1/K14') +(1/K14''))Q \qquad \text{Equation:}$$

The amount of flow through any given system is determined by a general circuit equation, where current, or flow rate in this case, is determined by the general principles of resistors in a circuit. Instead of voltage equaling the product of current and resistance, pressure drop is proportional to the product of flow-rate and K-value. Additional temperature sensors may be used to determine the temperature change from an inlet to the outlet of an individual cooling panel. For example, a first, or inlet, temperature sensor 63 is configured to measure the inlet cooling fluid temperature to a first cooling panel 46 and a second, or outlet, temperature sensor 63' is configured to measure the temperature of the cooling fluid at the outlet of the cooling panel. The temperature gradient and cooling fluid flow rate can be used to measure the heat dissipation rate.

The computer implemented computer program may provide a user with a quick and easy user interface to design and model a cooling panel array. Individual cooling panel icons 58 may be provided on a screen along with a cooling fluid inlet icon 65 and cooling fluid outlet icon 67. The entire cooling panel array, including connectors 59, may be configured by dragging and dropping the elements that represent the particular cooling panel configuration. In an exemplary embodiment, a cooling panel array is provided with downloadable software for installation into the computer implemented monitoring program. The computer implemented monitoring program may come with a plurality of common furnace cooling panel array configurations that can be selected. In another embodiment, the computer implemented monitoring program may comprise a database link to allow a user to select and download one or more cooling panel array configurations.

FIG. 4 shows a graph of pressure drop versus flow rate for an exemplary panel and an associated K-value. The K-value is the resistance of a panel to cooling fluid flow and is affected by the diameter and length of conduit as well as the number of bends in the conduit. The graph of pressure drop versus flow rate is relatively linear for the panel and the slope of this graph is the K-value for the panel. The K-value for a cooling panel is analogous to the resistance value of a resistor in a circuit that is governed by the equation, V=IR.

FIG. 5 shows an exemplary display 18 in the form of a chart of panel heat energy dissipation rates as a function of time. The time is listed in the first column and the heat energy dissipation rates are shown for a plurality of individual panels as well as a cumulative value. This chart may be used to log and track the change in heat energy dissipation rates from run to run. In addition, the heat energy dissipation rates may be normalized by dividing the heat dissipation rate of an individual panel by an exposure surface area to provide a specific heat energy dissipation rate. In this way, larger and smaller panels can be compared to one another to allow quicker determination of hot spots within a furnace. As shown in FIG. 5, the heat dissipation energy rate of Panel 1 exceeds 200 for a period of time, starting at the 10 minute point.

FIG. 6 shows an exemplary display 18 in the form of a line graph of heat energy dissipation rates as a function of time with a threshold value 84 that is being surpassed by one of the cooling panels 14. The heat dissipation rate is on the vertical axis, also referred to as the Y axis or ordinate and time, in minutes, is on the horizontal axis, also referred to as the X axis, or abscissa. The individual panel display line 86 exceeds the threshold value at approximately the five minute mark. The cumulative display line 88 is plotted along with the individual panels. Again, each panel may be normalized by exposure surface area. A line graph, as used herein, is defined as a plurality of values, such as a heat energy dissipation rates, displayed in a line as a function of time.

FIG. 7 shows an exemplary display 18 in the form of a line graph of heat energy dissipation rate as a function of time. A graph of a particular cooling panel or of the cumulative system may be selected for display by an operator. As shown in this graph, the heat dissipation rate peaks initially and then levels out substantially for the remainder of the time shown.

FIG. 8 shows an exemplary display 18, or a heat map diagram 83 of a plurality of panels configured with respect to each other around a furnace. The display shown is a combination display, wherein the actual heat energy dissipation rates are provided proximate each individual panel and each panel is a color or hue that is representative of a said rate, like a heat map. As shown, a first cooling panel 14 has a head dissipation rate of 63 and a second and adjacent Colling panel 14' has a heat dissipation rate of 36. The cooling panels with a higher heat energy dissipation rate are shown in darker hues, or may be shown in colors representative of a heat map, wherein a higher dissipation rate is analogous to a higher temperature. For example a high heat dissipation rate may be shown in a red color whereas a low heat dissipation rate may be shown in a blue color. The heat map display 82 shown in FIG. 8 is a heat map diagram 83 of the plurality of cooling panels configured around a furnace that allows for quicker identification of a cooling panel or area within the furnace that is becoming too hot. It is to be understood that all of the panels around a furnace may be displayed at one time. The particular view may split the furnace into discrete portions or it may be split and turned into a continuous view, much a like a world map. It is to be understood that a heat map display may comprise a plurality of colors as indicators of heat dissipation rates. As with other heat displays, such as those from thermal cameras, lower temperature surfaces may be in blue and green colors and higher temperature surfaces may be in yellow or red colors.

FIG. 9 shows an exemplary display in the form of a heat map display 82 of cooling panels configured around a furnace. The plurality of cooling panels are displayed in a schematic or diagram of their actual configuration with respect to each other around the furnace. In this display 18 panel 14" is indicated as having a higher heat energy dissipation rate as the hue is darker than other panels, such as 14' for example. Examination of a heat map diagram may provide very quick assessment of hot spots within a furnace. As shown, the cooling panels around a first electric arc 34 are providing much more heat energy dissipation than the cooling panels around a second electric arc 34'. An operator may throttle back the electric arc 34 in an effort to stabilize the furnace and reduce the differential in cooling panel heat energy dissipation rates.

As shown in FIG. 10, a container 54 of a cooling panel comprises important information about the cooling panel including the K-value and the exposure surface area. This information may be input into the furnace cooling system monitoring system manually, or it may be scanned in utilizing an instruction symbol scanner 56, for example. The K-value, exposure surface area, maintenance schedules and the like may all be incorporated into an instruction symbol, such as a barcode 52. Maintenance data or schedules may include predictive life data, such as when to change out the cooling panel. Maintenance data may be a function of time or flow through the cooling panel or heat energy dissipated. The maintenance data may utilize actual input data from the furnace cooling panel monitoring system to provide estimated maintenance activities or alert an operator when maintenance or change out is required.

It is to be understood that the heat energy dissipation rate and values described herein equate with or are proportional to the amount of cooling energy that the cooling panels input into the system.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A furnace cooling panel monitoring system comprising:
    a. a computer implemented monitoring program when executed by a processor and is configured to display a heat energy dissipation rate for each of a plurality of cooling panels configured in a cooling panel array proximal to a furnace;
    wherein each of said plurality of cooling panels has an associated K-value that is input into the computer implemented monitoring program,
    wherein the K-value is a constant for each of said plurality of cooling panels and is a flow rate resistance value of a cooling liquid flowing through each of said plurality of cooling panels;
    wherein an array inlet cooling liquid flow rate is measured and input into the computer implemented monitoring program;
    wherein a cooling liquid inlet temperature and a cooling liquid outlet temperature to each of said plurality of cooling panels is measured and input n the computer implemented monitoring program;
    wherein the computer implemented monitoring program utilizes the input K-value for each of said plurality of cooling panels, the array inlet cooling liquid flow rate, the cooling liquid inlet temperature and the cooling liquid outlet temperature of each of said plurality of cooling panels to calculate the heat energy dissipation rate for each of said plurality of cooling panels;

wherein the heat energy dissipation rate for each of said plurality of cooling panels is displayed in real time on a display screen;

whereby an operator can monitor the heat energy dissipation rate of each of said plurality of cooling panels in real time.

2. The furnace cooling panel monitoring system of claim 1, wherein the furnace is an electric arc furnace.

3. The furnace cooling panel monitoring system of claim 1, wherein the display comprises a heat map display;

wherein the heat energy dissipation rate for each of said plurality of cooling panels is displayed as a color representing said heat dissipation rate.

4. The furnace cooling panel monitoring system of claim 1, wherein the display comprises a diagram display of the plurality of cooling panels configured with respect to each other, and wherein the associated heat energy dissipation rates of the plurality of cooling panels are displayed proximate to each of said displayed cooling panels.

5. The furnace cooling panel monitoring system of claim 1, wherein the display comprises a diagram of the plurality of cooling panels with respect to each other and in a heat map display, wherein each of said plurality of cooling panels are displayed in a color that is representative of the heat energy dissipation rate for each of said displayed cooling panels.

6. The furnace cooling panel monitoring system of claim 1, wherein each of said plurality of cooling panels has an associated threshold heat energy dissipation rate value that is input into the computer implemented monitoring program; and wherein the computer implemented monitoring program comprises an alarm function, whereby an alarm is initiated if at least one of the plurality of cooling panels has a heat energy dissipation rate that is above a threshold value.

7. The furnace cooling panel monitoring system of claim 1, wherein the computer implemented monitoring program comprises an alarm function, whereby an alarm is initiated if a first cooling panel has the heat energy dissipation rate that is greater than a differential threshold value, set in the computer implemented monitoring program, of any of the plurality of cooling panels adjacent to said first cooling panel.

8. The furnace cooling panel monitoring system of claim 1, wherein the computer implemented monitoring program comprises a heat dissipation flux rate threshold value input, and whereby an alarm is initiated if at least one of the plurality of cooling panels has a heat dissipation flux rate greater than said heat dissipation flux threshold value input.

9. The furnace cooling panel monitoring system of claim 1, wherein the computer implemented monitoring program comprises a calculation of a specific heat energy dissipation rate, and wherein said specific heat energy dissipation rate is equal to the heat energy dissipation rate of a first cooling panel divided by an exposure surface area of said first cooling panel.

10. The furnace cooling panel monitoring system of claim 1, wherein the plurality of cooling panels are configured between an array cooling fluid inlet and an array cooling fluid outlet and wherein at least two or the plurality of cooling panels are configured in a parallel configuration between the array cooling fluid inlet and the array cooling fluid outlet.

11. The furnace cooling panel monitoring system of claim 1, further comprising an array inlet cooling liquid flow rate sensor that provides input of the array inlet cooling liquid flow rate to the computer implemented program.

12. A furnace cooling panel monitoring method comprising:
  a. providing a computer implemented monitoring program when executed by a processor is configured to display a heat energy dissipation rate for each of a plurality of cooling panels configured in a cooling panel array proximal to a furnace;
  b. inputting K-values for each of said plurality of cooling panels into the computer implemented monitoring program,
  c. inputting an array cooling liquid inlet flow rate into the computer implemented monitoring program;
  d. inputting a cooling liquid inlet temperature and a cooling liquid outlet temperature of each of said plurality of cooling panels into the computer implemented monitoring program;
  e. calculating the heat energy dissipation rate for each of said plurality of cooling panels;
    wherein the computer implemented monitoring program utilizes the input K-value for each of said plurality of cooling panels, the array inlet cooling liquid flow rate, the cooling liquid inlet temperature and the cooling liquid outlet temperature of each of said plurality of cooling panels to calculate the heat energy dissipation rate for each of said plurality of cooling panels;
  f. displaying, in real time on a display screen, the heat energy dissipation rates for each of said plurality of panels; and
  g. monitoring the heat energy dissipation rate of each individual panel in real time on the display.

13. The furnace cooling panel monitoring method of claim 12, wherein the furnace is an electric arc furnace.

14. The furnace cooling panel monitoring method of claim 12, wherein the display comprises a fine graph comprising a heat dissipation axis and a time axis.

15. The furnace cooling panel monitoring method of claim 12, wherein the display comprises a heat map display;

wherein the heat energy dissipation rate for each of said plurality of cooling panels is displayed as a color representing said heat dissipation rate.

16. The furnace cooling panel monitoring method of claim 12, further comprising the step of inputting a threshold heat energy dissipation rate value for each of said plurality of cooling panels into the computer implemented monitoring program; and wherein the computer implemented monitoring program comprises an alarm function, whereby an alarm is initiated if at least one of the plurality of cooling panels has the heat energy dissipation rate that is above a threshold value.

17. The furnace cooling panel monitoring method of claim 12, further comprising the step of inputting a heat dissipation flux rate threshold value for each of said plurality of cooling panels into the computer implemented monitoring program, and whereby an alarm is initiated if at least one of the plurality of cooling panels has a heat dissipation flux rate greater than said heat dissipation flux threshold value input.

18. The furnace cooling panel monitoring method of claim 12, further comprising the step of inputting a heat dissipation flux differential value into the computer implemented monitoring program, and wherein the computer implemented monitoring program calculates a heat dissipation flux for each of the plurality of cooling panels and wherein said computer implemented monitoring program initiates an alarm if one of the plurality of cooling panels has a heat dissipation flux that is greater than said heat dissipation flux differential value.

19. The furnace cooling panel monitoring method of claim 12, further comprising the step of the computer implemented monitoring program calculating a specific heat energy dissipation rate, and wherein said specific heat energy dissipation rate is equal to the heat energy dissipation rate of a first cooling panel divided by an exposure surface area of said first cooling panel.

20. The furnace cooling panel monitoring method of claim 12, wherein the plurality of cooling panels are configured between an array cooling fluid inlet and an array cooling fluid outlet and wherein at least two or the plurality of cooling panels are configured in a parallel configuration between the array cooling fluid inlet and the array cooling fluid outlet.

\* \* \* \* \*